United States Patent [19]

Sugiura

[11] Patent Number: 4,528,955
[45] Date of Patent: Jul. 16, 1985

[54] KNOCK CONTROL SYSTEM

[75] Inventor: Noboru Sugiura, Katsuta, Japan

[73] Assignee: Hitachi, Ltd., Tokyo, Japan

[21] Appl. No.: 458,324

[22] Filed: Jan. 17, 1983

[30] Foreign Application Priority Data

Jan. 19, 1982 [JP] Japan .................................. 57-7091

[51] Int. Cl.³ .............................................. F02P 5/04
[52] U.S. Cl. ......................................... 123/425; 73/35
[58] Field of Search ...................... 123/425, 435; 73/35

[56] References Cited

U.S. PATENT DOCUMENTS

| 4,116,175 | 9/1978 | Sand | 123/425 |
| 4,279,143 | 7/1981 | Guipaud | 123/425 |
| 4,351,282 | 9/1982 | Utsumi | 123/425 |
| 4,423,621 | 1/1984 | Kenichi | 123/425 |
| 4,425,891 | 1/1984 | Kashimura | 123/425 |

Primary Examiner—Ronald B. Cox
Attorney, Agent, or Firm—Antonelli, Terry & Wands

[57] ABSTRACT

A gain control system comprising a gain variable amplifier for amplifying an input signal linearly, a gain control circuit for producing a gain control signal for controlling the gain of the amplifier on the basis of an output signal of the amplifier, and a gain control signal controller for controlling the gain control signal to prevent the gain of the gain variable amplifier from changing abruptly. A signal for controlling the ignition timing is produced by a comparison of a background level of engine noise with the output of a knock sensor. The background level signal is produced by a first integration circuit having a time constant of $T_1$. The gain of the output signal from the knock sensor is controlled by an output signal from the background level sensor which is integrated by a second integration circuit having a time constant of $T_2$ in which $T_2 > T_1$.

2 Claims, 23 Drawing Figures

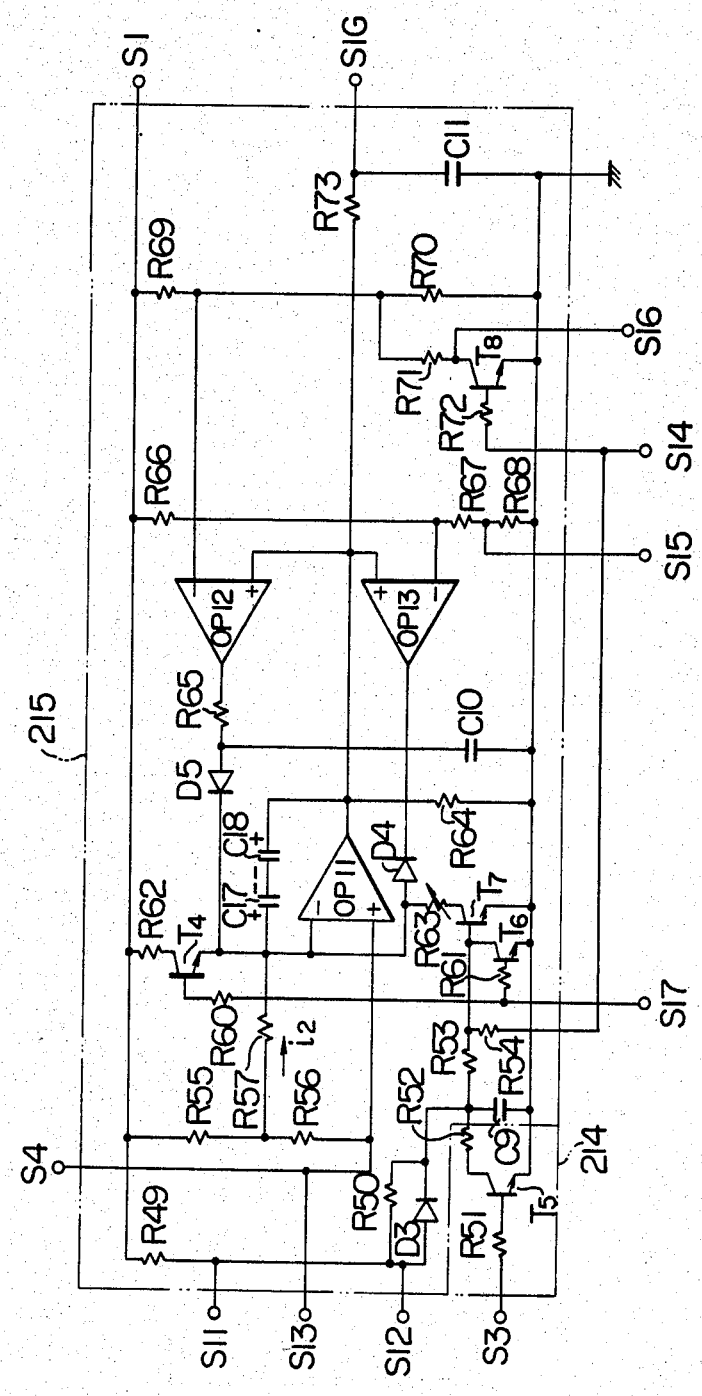
F I G. 5

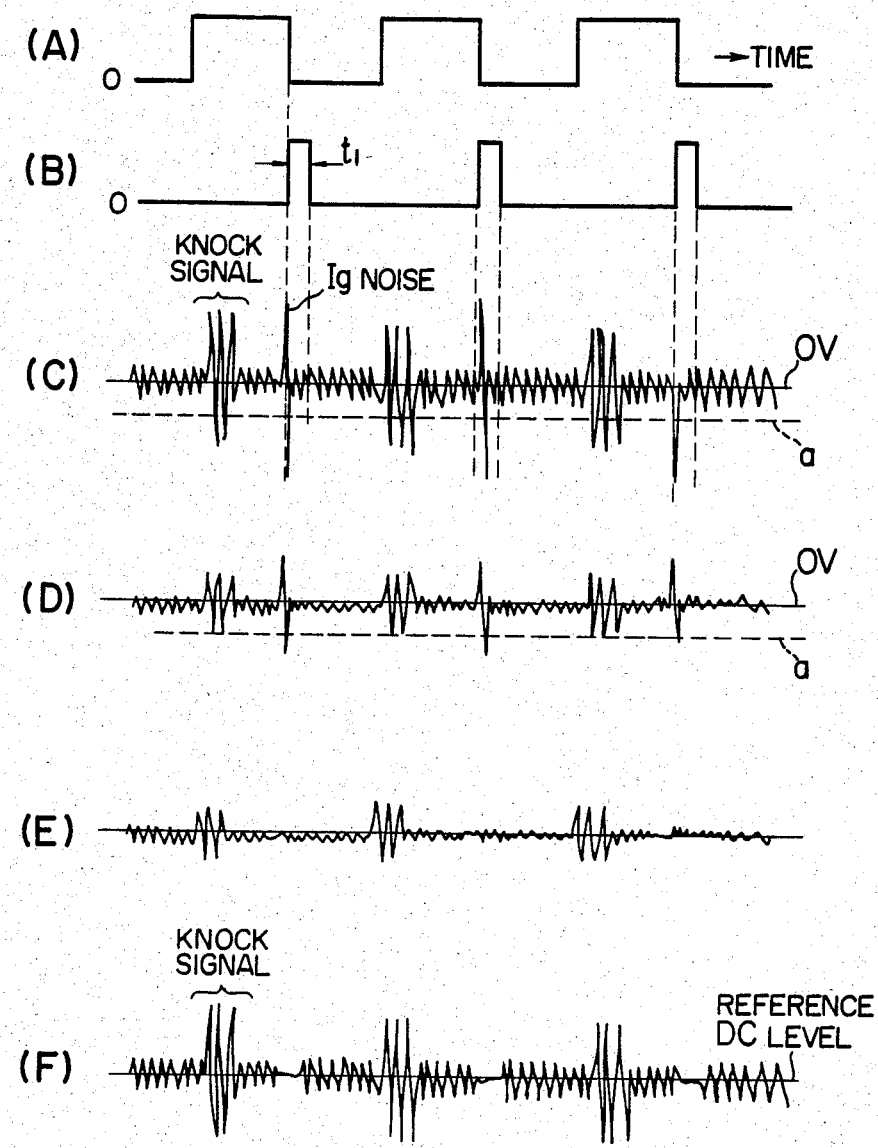

KNOCK CONTROL SYSTEM

The present invention relates to a knock control system for an internal combustion engine, or more particularly to a knock control system for detecting a knock signal accurately thereby to control knock properly regardless of engine speed.

The knock generated in the engine is accompanied by a knocking noise and therefore reduces the running performance on one hand and a reverse torque is generated which reduces the engine output or the engine is overheated or is destroyed on the other hand. The knock thus generated has a close relation with the ignition timing, and it is known that the characteristics of the engine are such that the engine output is maximized by setting the ignition timing, namely, the ignition advance angle immediately before knock. If the ignition advance is reduced to avoid the knocking, the engine output is reduced. Therefore the ignition timing is required to be controlled at a point immediately before a knocking.

Generally, the output of a knock sensor for detecting a knock sound increases with the increase of engine speed, which in turn increases the background level (BGL), with the result that any knocking that may occur is accurately detected.

Since the BGL is obtained by averaging the output of the knock sensor and by making use of the charging and discharging of a capacitor, however, the gain of a gain variable amplifier changes with the ripple carried in the output signal of the knock sensor. Although the knock signal is capable of following the ripple change, the output signal of the averaging circuit of BGL is delayed and therefore a knock cannot be detected accurately by comparison of the two signals.

Accordingly, it is the object of the present invention to provide a knock control system capable of accurate knock control.

In order to achieve this object, according to the present invention, there is provided a knock control system in which the output of a gain control circuit for controlling the gain of the gain variable amplifier for amplifying the knock signal is provided with an integration time constant thereby to effect accurate knock control.

The above and other objects, features and advantages will be made apparent by the detailed description taken in conjunction with the accompanying drawings, in which:

FIGS. 2 to 8 show the circuits of various parts in detail;

Figure 1:
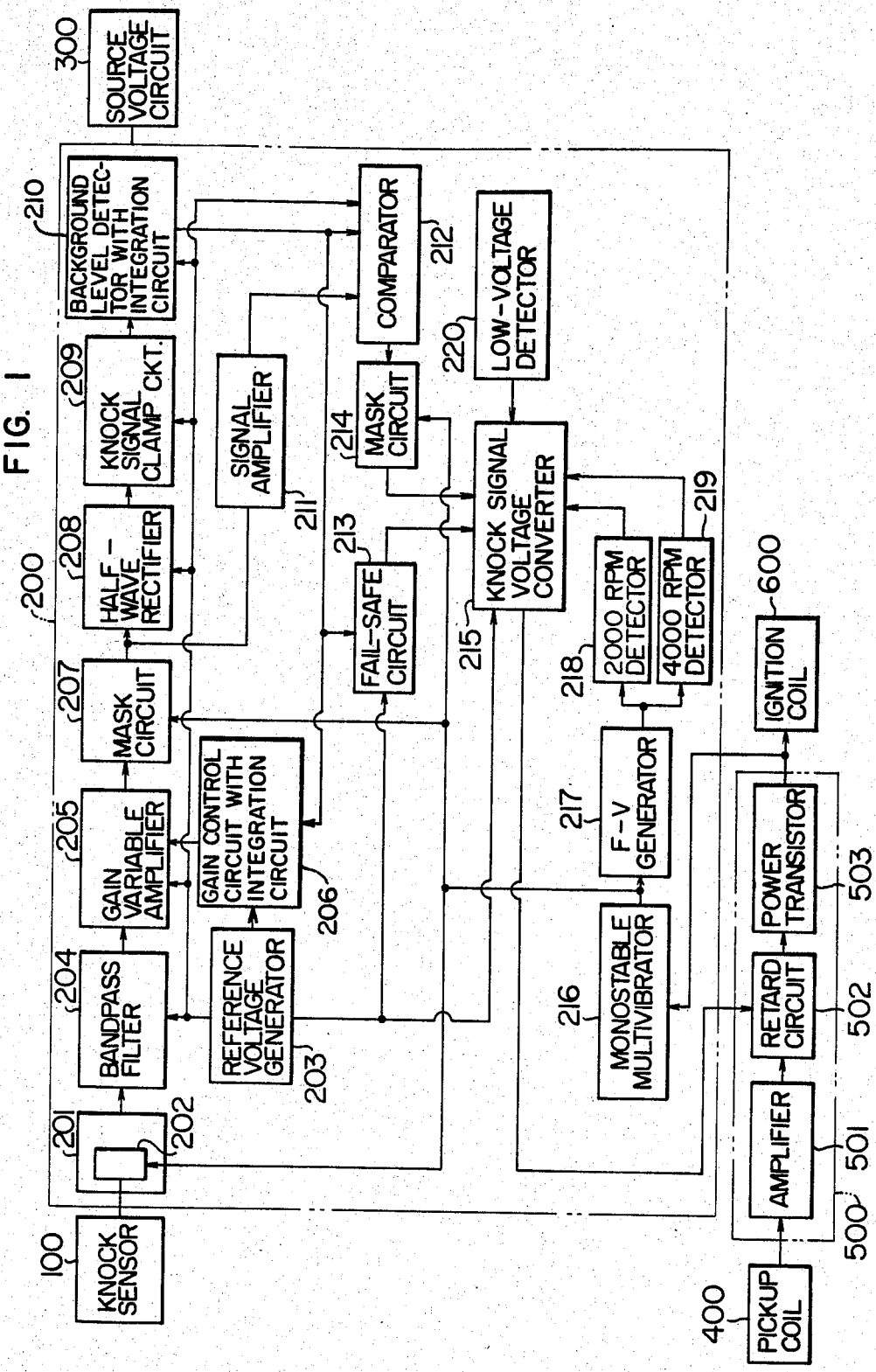
FIG. 1 is a diagram showing a general configuration of a typical example of a knock control system according to the present invention.

The present invention will be explained below in detail with reference to the accompanying drawings. FIG. 1 shows a block diagram of a typical example of a knock control system according to the present invention.

In the drawing, a knock control system comprises a knock sensor 100 for detecting a knock signal, a knock control unit 200 for applying a control signal for controlling the ignition timing of an ignition coil 600 in response to the knock signal supplied from the knock sensor 100, a pickup coil 400 for detecting the spark timing of the ignition coil 600, and a contactless ignition means 500 for igniting the ignition coil and supplying a feedback signal to the knock control unit 200 in response to the output of the pickup coil 400 and the knock control unit 200.

The knock control unit 200, in response to a detection signal of the knock sensor 100 and an output signal of the contactless ignition means 500, controls the contactless ignition means 500 thereby to control the ignition advance or retardation in accordance with the knocking involved.

The knock control unit 200 includes an amplifier 201 having an ignition noise cutoff circuit 202 with a gate for cutting off the ignition noise in synchronism with the spark timing, a band pass filter (BPF) 204 for passing the knock signal, a gain variable amplifier circuit (AGC circuit) 205 for controlling the gain of the amplifier thereof in proportion to the input signal ratio in response to the output of BPF 204, a mask circuit 207 for masking the AGC output for a predetermined timing period, a half wave rectifier ciruit 208 for half-wave rectifying the input signal supplied from the AGC circuit 205 through the mask circuit 207, a knock signal clamp circuit 209 for preventing the background level from being affected by a large knock signal inserted in the half wave signal of the half wave rectifier circuit 208, a background level (BGL) detector circuit 210 for obtaining the average value of the knock signals, a gain control circuit 206 for amplifying the output of the BGL detector circuit 210 and feeding back it to the AGC circuit 205, a signal amplifier circuit 211 for amplifying the output of the mask circuit 207, a comparator 212 for comparing the output voltage of the BGL detector circuit 210 with the output signal of the signal amplifier circuit 211 and producing a retardation signal proportional to the knocking, a mask circuit 214 for masking the output of the comparator 212 at a predetermined timing and producing an output, a knock signal voltage converter circuit 215 for integrating the output of the mask circuit 214 and producing a voltage value corresponding to the retardation signal proportional to the knocking, a fail-safe circuit 213 for detecting an open fault of the knock sensor 100 and thereby retarding the ignition timing forcibly, a monostable circuit 216 for producing a signal of a predetermined pulse duration in synchronism with the cutoff of the ignition coil 600 (namely, in synchronism with the base current of the power transistor 503) in response to the signal from the contactless ignition means 500, a F-V generator 217 for producing a voltage proportional to the engine speed in response to the output pulse of the monostable circuit 216, a 2000-rpm detector circuit 218 for producing a signal associated with 2000 r.p.m. or higher engine speed in response to the output of the F-V generator 217, a 4000- rpm detector circuit 219 for producing a signal when the engine speed is 4000 r.p.m. or higher, a low-voltage detector circuit 220 for disabling the knock control by detecting a battery voltage drop at the time of engine start, and a reference voltage generator circuit 203.

The contactless ignition means 500 includes an amplifier 501 for shaping the waveform of the output signal of the pickup coil 400, a retard circuit 502 for controlling the ignition timing in accordance with the output voltage of the knock control circuit 200, and the power transistor 503 for generating a high voltage on the secondary side of the ignition coil 600.

Now, the circuits of the knock control means 200 will be explained in detail.

Figure 2:
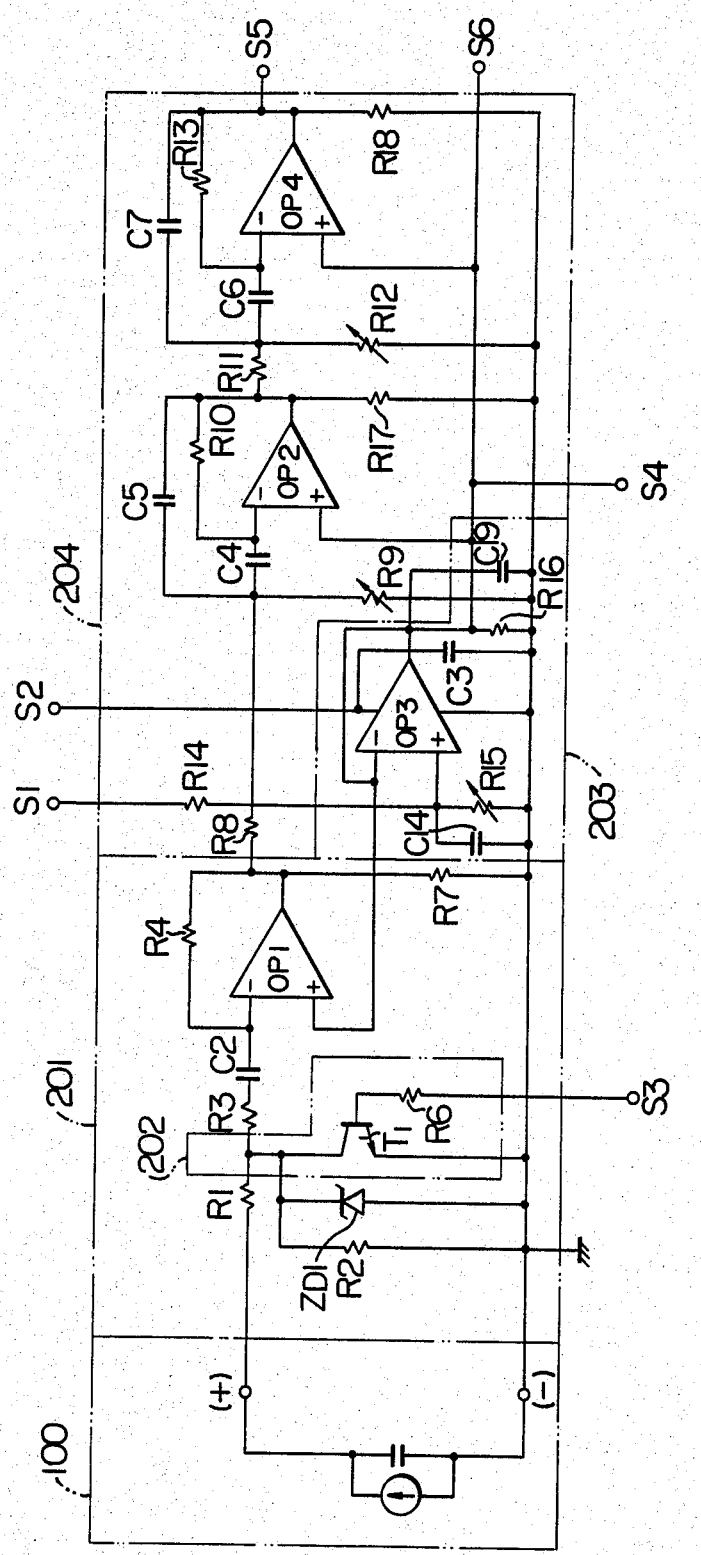

The detailed circuits of the knock sensor 100, the amplifier 201, the ignition noise cutoff circuit 202, the reference voltage generator circuit 203 and the bandpass filter (BPF) 204 are shown in FIG. 2.

Specifically, the knock sensor 100 is of capacitance type using a piezoelectric element and is equivalent to a parallel circuit including a capacitor C and a constant current source.

The positive terminal (+) of the knock sensor 100 is connected with a resistor R1, the other end of which is connected to a resistor R2, a resistor R3, the cathode of a zener diode ZD1 and the collector of a transistor T1. The other end of the resistor R2, the anode of the zener diode AD1, and the emitter of the transistor T1 are grounded. The base of the transistor T1 is connected to the monostable circuit (OSM) 216 through a resistor R6. The other terminal of the resistor R3 is connected to the negative terminal (−) of an operational amplifier OP1 through a capacitor C2. The operational amplifier OP1 is negatively fed back with the output thereof through a resistor R4, and the output terminal of the operational amplifier OP1 is connected with resistors R7 and R8. The other end of the resistor R7 is grounded, and the other end of the resistor R8 is connected to capacitors C4, C5 and a variable resistor 9.

The resistors R1, R2, R3, R4, R7, the capacitor C2, and the operational amplifier OP1 make up an amplifier circuit 201, while the transistor T1 and the resistor R6 construct the ignition noise cutoff circuit 202.

The other end of the variable resistor R9 is grounded, and the other end of the capacitor C4 is connected to the input terminal (−) of the operational amplifier OP2. The other end of the capacitor C5 is connected to the output terminal of the operational amplifier OP2. The operational amplifier OP2 is negatively fed back with the output thereof through the resistor R10. The positive input terminal (+) of the operational amplifier OP2 is connected to the output terminal of the operational amplifier OP3. The output terminal of the operational amplifier OP2 is connected to resistors R11 and R17. The other end of the resistor R17 is grounded, and the other end of the resistor R11 is connected to a variable resistor R12 and capacitors C6 and C7. The other end of the variable resistor R12 is grounded, and the other end of the capacitor C6 is connected to the negative terminal (−) of an operational amplifier OP4. The operational amplifier OP4 is fed back negatively with the output thereof through a resistor R13. The other end of the capacitor C7 is connected to the output terminal of the operational amplifier OP4. The positive input terminal (+) of the operational amplifier OP4 is connected to the output terminal of the operational amplifier OP3. The output terminal of the operational amplifier OP4 is connected through a resistor R18 to a resistor R19 of the gain variable amplifier circuit 205. The other end of this resistor R18 is grounded.

The resistors R8, R9, R10, R11, R12, R13, R17, R18, the capacitors C4, C5, C6, C7 and the operational amplifiers OP2, OP4 make up the bandpass filter (BPF) 204. This BPF 204 is a two-stage filter.

The positive input terminal (+) of the operational amplifier OP3 is connected to a capacitor C14 and a variable resistor R15. The other ends of the capacitor C14 and the resistor 15 are grounded. The operational amplifier OP3 is supplied with a source voltage as a drive power through S2. The operational amplifier OP3 is negatively fed back with the output thereof and·has an output terminal connected with a resistor R16 and a capacitor C19. The other ends of the resistor R16 and the capacitor C19 are grounded. The power terminal of the operational amplifier OP3 is grounded through the capacitor C3.

The resistors R15, R16, the capacitors C3, C14, C19 and the operational amplifier OP3 make up the reference voltage generator circuit 203. By changing the resistance values of the resistors R14 and R15, the output RV of the operational amplifier OP3 is fixed to a reference voltage of, say, 3.6 V.

Figure 3:
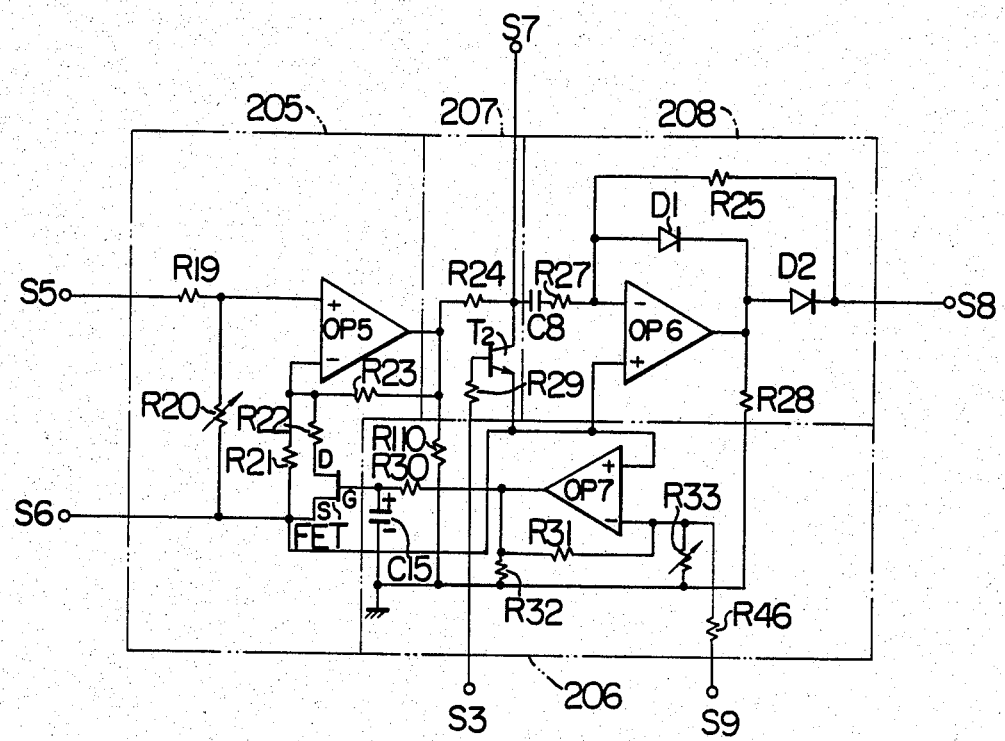

FIG. 3 shows detailed circuits of the gain variable amplifier 205, the gain control circuit 206, the mask circuit 207 and the half wave rectifier circuit 208.

In this drawing, the terminal S5 shown in FIG. 2 is connected with a resistor R19, which in turn is connected to the positive terminal (+) of an operational amplifier OP5 and a variable resistor R20. The other end of this variable resistor R20 is connected to the terminal S6 shown in FIG. 2. The negative input terminal (−) of the operational amplifier OP5 is connected to resistors R21, R22 and R23. The other end of this resistor R22 is connected to the drain of an FET. The source of this FET is connected to the terminal S6 shown in FIG. 2, and the gate thereof is connected to a resistor R30 and a capacitor C15. The other end of this capacitor C15 is grounded, and the other end of the resistor R30 is connected to the output terminal of the operational amplifier OP7. The other end of the resistor R21 is connected to the positive input terminal (+) of the operational amplifier OP7. The other end of the resistor R23 is connected to the output terminal of the operational amplifier OP5. The output terminal of the operational amplifier OP5 is connected to the resistors R24 and R110. The other end of this resistor R110 is grounded. The other end of the resistor R24 is connected to the terminal S7, the capacitor C8 and the collector of the transistor T2. The capacitor C8 is connected through a resistor R27 to the negative input terminal (−) of the operational amplifier OP6. The negative input terminal (-) of the operational amplifier OP6 is connected to a resistor R25 and the anode of a diode D1. The cathode of this diode D1 is connected to the output terminal of an operational amplifier OP6 and the anode of a diode D2. The cathode of this diode D2 is connected to a resistor R25 and the terminal S8.

The positive input terminal (+) of the operational amplifier OP6 is connected to the emitter of the transistor T2 and the positive input terminal (+) of an operational amplifier OP7. The base of the transistor T2 is connected through a resistor R29 to terminal S3. The negative input terminal (−) of the operational amplifier OP7 is connected to the resistor R31, a variable resistor R33, and a resistor R46. The other end of this resistor R31 is connected to the output terminal of the operational amplifier OP7, and the other end of the variable resistor R33 is grounded. The other end of the resistor R46 is connected to the terminal S9. The output terminal of the operational amplifier OP7 is grounded via a resistor R32.

The resistors R19, R20, R21, R22, R23, the field effect transistor, and the operational amplifier OP5 make up the gain variable amplifier circuit 205.

The resistors R30, R31, R32, R33, R46, the capacitor C15, and the operational amplifier OP7 make up the gain control circuit 206.

The resistors R24, R29, R110 and the transistor T2 make up the mask circuit 207.

Further, the resistors R25, R27, R28, the capacitor C8, the diodes D1, D2, and the operational amplifier OP6 make up the half wave rectifier circuit 208.

Figure 4:
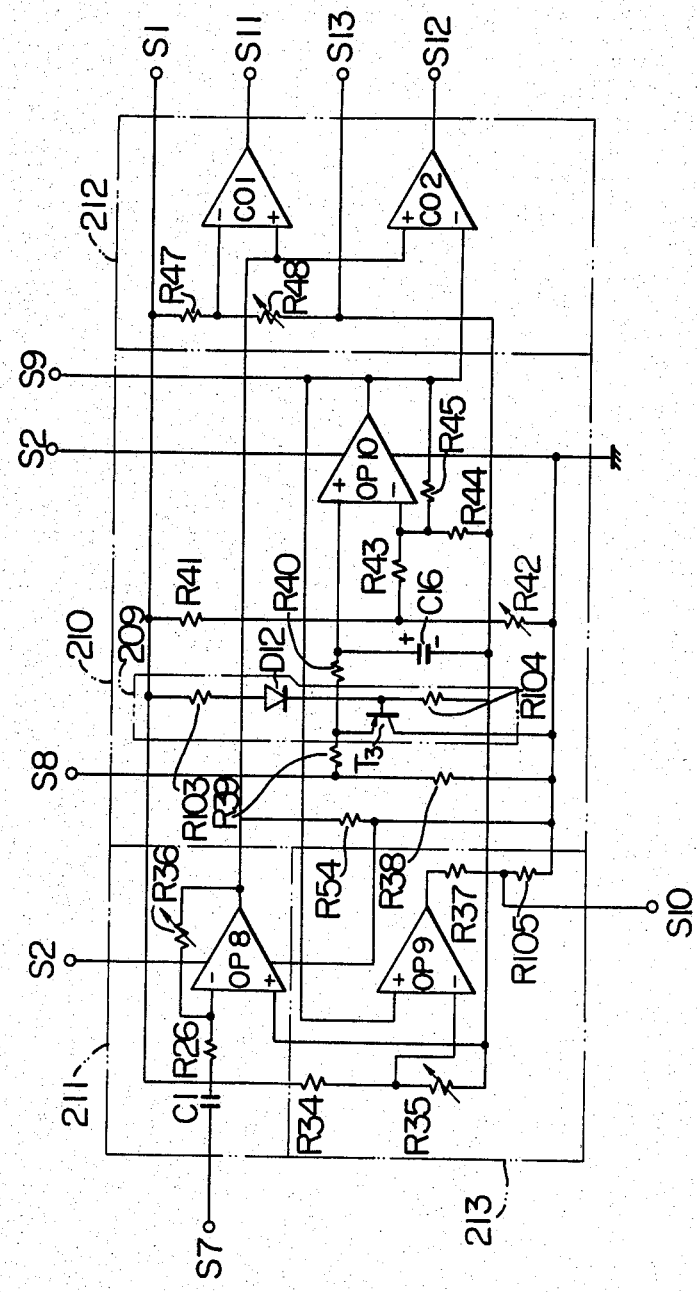

FIG. 4 shows detailed circuits of the knock signal clamp circuit 209, the background level (BGL) detector circuit 210, the signal amplifier circuit 211, the comparator 212, and the fail-safe circuit 213.

In the diagram, the terminal S7 of FIG. 3 is connected through the capacitor C1 to a resistor R26. The other end of this resistor R26 is connected to a variable resistor R36 and the input terminal (−) of an operational amplifier OP8. The other end of the variable resistor R36 is connected to the output terminal of the operational amplifier OP8.

The capacitor C1, the resistors R26, R36 and the operational amplifier OP8 make up the signal amplifier circuit 211.

The operational amplifier OP8 is supplied power from the terminal S2, and has a terminal grounded. The positive input terminal (+) of the operational amplifier OP8 is connected to the variable resistor R35 and the terminal S13. The other end of the variable resistor R35 is connected to the terminal S1 of FIG. 2 through a resistor R34. The other end of the variable resistor R35 is connected to the negative input terminal (−) of an operational amplifier OP9. The positive input terminal (+) of the operational amplifier OP9 is connected to the terminal S9. The output terminal of the operational amplifier OP9 is connected to a resistor R37, the other end of which is connected to a resistor R105 and the terminal S10. The other end of this resistor R105 is grounded.

The resistors R34, R35, R37, R105 and the operational amplifier OP9 make up the fail-safe circuit 213.

The output terminal of the operational amplifier OP8 is connected to the resistor R54 and the positive input terminals (+) of comparators C01 and C02. The other end of this resistor R54 is grounded. The terminal S1 is connected to the anode of a diode D12 through a resistor R103, and the cathode of this diode D12 is connected to the base of a transistor T3 and a resistor R104. The emitter of this transistor T3 is connected to the resistors R39 and R40, and the collector thereof is grounded. The other end of this resistor R39 is connected to the terminal S8 and the resistor R38, and the other end of the resistor R38 is grounded. The other end of the resistor R40 is connected to the positive input terminal (+) of an operational amplifier OP10 and a capacitor C16. The other end of this capacitor C16 is connected to the terminal S13. The negative input terminal (−) of the operational amplifier OP10 is connected to a resistor R43, the resistor R44 and the resistor R45. The other end of the resistor R43 is connected to the resistor R41 and the variable resistor R42. The other end of the resistor R41 is connected to the terminal S1. The other end of the variable resistor R42 is grounded. The other end of the resistor R44 is connected to the terminal S13. The other end of the resistor R45 is connected to the output terminal of an operational amplifier OP10. The output terminal of the operational amplifier OP10 is connected to the terminal S9 and the positive input terminal (+) of the operational amplifier OP9.

The other end of the resistor R104, on the other hand, is connected to the terminal S13.

The resistors R103, R104, the diode D12 and the transistor T3 make up the knock signal clamp circuit 209.

The resistors R54, R38, R39, R40, R41, R42, R43, R44, R45, the capacitor C16, and the operational amplifier OP10 make up the background level (BGL) detector circuit 210.

The negative input terminal (−) of the comparator C01 of which the positive input terminal (+) is connected to the output terminal of the operational amplifier OP8 is connected to the resistor R47 and the variable resistor R48. The other end of this resistor R47 is connected to the terminal S1, and the other end of the variable resistor R48 is connected to the terminal S13. The output terminal of the operational amplifier OP8 is connected to the positive input terminal (+) of the comparator C02, of which the negative terminal (−) is connected to the output terminal of the operational amplifier OP10. The output terminal of the comparator C01 is connected to the terminal S11, and the output terminal of the comparator C02 is connected to the terminal S12.

The resistors R47, R48, and the comparators C01, C02 make up the comparator circuit 212.

Detailed circuits of the mask circuit 214, and the knock signal voltage converter circuit 215 are shown in FIG. 5.

In the drawing, the terminal S3 of FIG. 2 is connected through a resistor R51 to the base of a transistor T5, and the collector of the transistor T5 is connected to a resistor R52, while the emitter thereof is grounded.

The resistors R51, R52 and the transistor T5 make up the mask circuit 214.

The terminal S11 of FIG. 4 is connected to the resistors R49, R50 and the anode of the diode D3. The terminal S12 of FIG. 4 is similarly connected to the resistors R49, R50 and the anode of the diode D3. The other end of this resistor R49 is connected to the terminal S1 of FIG. 2. The other end of the resistor R50 is connected to the cathode of the diode D3. The cathode of the diode D3 is connected to the resistors R52, R53 and a capacitor C9. The other end of the capacitor C9 is grounded, and the other end of the resistor R53 is connected to the resistor R54, the collector of a transistor T6 and the base of a transistor T7. The other end of the resistor R54 is connected to the terminal S14. The collector of the transistor T7 is connected to a variable resistor R63, and the emitter thereof is grounded. The base of the transistor T6 is connected to a resistor R61, and the emitter of the transistor T6 is grounded. The other end of the resistor R61 is connected to the terminal S17 and the resistor R60. The other end of the resistor R60 is connected to the base of the transistor T4, the collector of which is connected through a resistor R62 to the terminal S1 of FIG. 2, while the emitter thereof is connected to the cathode of the diode D5 and the negative input terminal (−) of an operational amplifier OP11. The negative input terminal (−) of the operational amplifier OP11 is connected to a capacitor C17, a resistor R57 and the anode of a diode D4. The other end of the resistor R57 is connected to the resistors R55 and R56. The other end of the resistor R55 is connected to the terminal S1 of FIG. 2. The other end of the resistor R56 is connected to the terminal S4 of FIG. 2, the terminal S13 of FIG. 4, and the positive input terminal (+) of the operational amplifier OP11.

The other end of the capacitor C17 is connected via the capacitor C18 to the output terminal of the operational amplifier OP11. The output terminal of the operational amplifier OP11 is connected to a resistor R64, the positive input terminal (+) of the operational amplifier OP12, the positive input terminal (+) of the operational amplifier OP13 and the resistor R73. The other end of the resistor R64 is grounded, and the negative input terminal (−) of the operational amplifier OP12 is connected through a resistor R69 to the terminal S1 of FIG. 2. The output terminal of the operational amplifier OP12 is connected through a resistor R65 to the anode of a diode D5 and a capacitor C10. The other end of the capacitor C10 is grounded. The negative input terminal (−) of the operational amplifier OP12 is connected to resistors R70 and R71. The other end of the resistor R70 is grounded. The other end of the resistor R71 is connected to the terminal S16 and the collector of a transistor T8. The emitter of the transistor T8 is grounded, and the base thereof is connected via a resistor R72 to the terminal S14.

On the other hand, the negative input terminal (−) of the operational amplifier OP13 is connected through the resistor R67 to the resistor R68 and the terminal S15. Also, the output terminal of the operational amplifier OP13 is connected to the cathode of the diode D4.

The resistor R73 is connected to the capacitor C11 and the signal terminal SIG. The other end of the capacitor C11 is grounded.

The knock signal voltage converter circuit 215 is comprised of the resistors R49, R50, R53, R54, R55, R56, R57, R60, R61, R62, R63, R64, R65, R66, R67, R68, R69, R70, R71, R72, R73, the capacitors C9, C10, C11, C17, C18, the diodes D3, D4, D5, the transistors T4, T6, T7, T8, the operational amplifier OP11, OP12, OP13.

Figure 6:
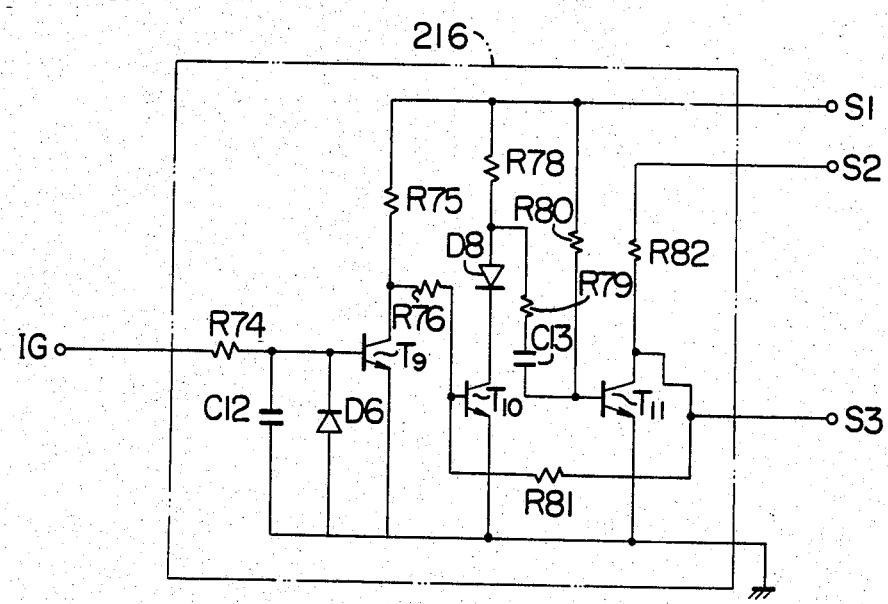

FIG. 6 shows the monostable multivibrator circuit (OSM) 216 in detail.

In the diagram, the input terminal IG supplied with the ignition signal, namely, the signal from the power transistor 503 is connected to a resistor R74, the other end of which is connected to a capacitor C12, the cathode of a diode D6 and the base of a transistor T9. The other end of this capacitor C12 and the anode of the diode D6 are grounded. The emitter of the transistor T9 is grounded, and the collector thereof is connected to a resistor R75 and a resistor R76. The other end of the resistor R75 is connected to the terminal S1 of FIG. 2, and the other end of the resistor R76 is connected to the base of a transistor T10 and a resistor R81. The emitter of the transistor T10 is grounded, and the collector thereof is connected to the cathode of a diode D8. The anode of the diode D8 is connected to resistors R78 and R79. The other end of the resistor R78 is connected to the terminal S1 of FIG. 2, and the other end of the resistor R79 is connected through a capacitor C13 to the base of a transistor T11. The base of the transistor T11 is also connected to the terminal S1 of FIG. 2 through a resistor R80, and the emitter thereof is connected to the earth. The collector of the transistor T11 is connected to a resistor R81, a resistor R82 and the terminal S3 of FIG. 2. The other end of the resistor R82 is connected to the terminal S2 of FIG. 2.

The resistors R74, R75, R76, R78, R79, R80, R81, the capacitors C12, C13, the diodes D6, D8, and the transistors T9, T10, T11 make up a monostable multivibrator circuit 216.

Figure 7:
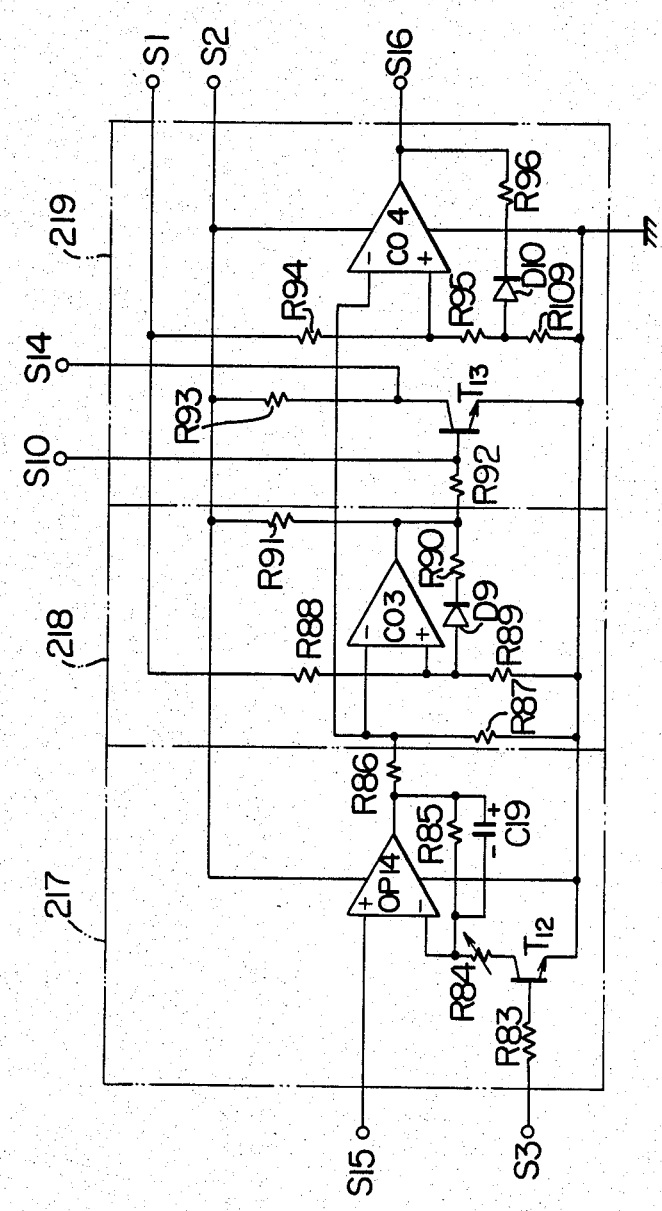

FIG. 7 shows the F-V generator circuit 217, the 2000-rpm detector circuit 218, and the 4000-rpm detector circuit 219 in detail.

In FIG. 7, the terminal S15 of FIG. 5 is connected to the positive input terminal (+) of an operational amplifier OP14. The negative input terminal (−) of this operational amplifier OP14 is connected to a resistor R85, a variable resistor R84 and a capacitor C19. The other end of the resistor R85 is connected to the output terminal of the operational amplifier OP14. The other end of the variable resistor R84, on the other hand, is connected to the collector of a transistor T12. The emitter of the transistor T12 is grounded, and the base thereof is connected to the terminal S3 of FIG. 2 through a resistor R83. The other end of the capacitor C19 is connected to the output terminal of the operational amplifier OP14. The output terminal of this operational amplifier OP14 is connected through a resistor R86 to a resistor R87, the negative input terminal (−) of a comparator C03 and the negative input terminal (−) of a comparator C04. The operational amplifier OP14 is supplied with a power source from the terminal S2 of FIG. 2, and has a terminal grounded. The positive input terminal (+) of the comparator C03 is connected to resistors R88, R89, and the anode of a diode D9, and the other end of the resistor R89 is grounded. The other end of the resistor R88 is connected to the terminal S1 of FIG. 2. The cathode of the diode D9 is connected via a resistor R90 to the output terminal of the comparator C03. The output terminal of the comparator C03 is connected to resistors R91 and R92. The other end of the resistor R91 is connected to the terminal S2 of FIG. 2, the other end of the resistor R92 being connected to the terminal S10 of FIG. 4 and the base of a transistor T13. The emitter of the transistor T13 is grounded, and the collector thereof is connected to the terminal S14 of FIG. 5 and a resistor R93. The other end of the resistor R93 is connected to the terminal S2 of FIG. 2.

On the other hand, the positive input terminal (+) of the comparator C04 is connected to resistors R94 and R95. The other end of the resistor R94 is connected to the terminal S2 of FIG. 2, and other end of the resistor R95 is connected to a resistor R109 and the anode of a diode D10. The other end of the resistor R109 is grounded. The cathode of the diode D10 is connected to the output terminal of the comparator C04 through a resistor R96. The comparator C04 is supplied with power from the terminal S2 of FIG. 2, and is grounded. The output terminal of the comparator C04 is connected to the terminal S16 shown in FIG. 5.

The resistors R83, R84, R85, R86, the transistors T12, the capacitor C19, and the operational amplifier OP14 make up the F-V generator 217.

The resistors R87, R88, R89, R90, R91, the diode D9, and the comparator C03 make up the 2000-rpm detector circuit 218.

Further, the resistors R92, R93, R94, R95, R96, R109, the transistor T13, the diode D10 and the comparator C04 make up the 4000-rpm detector circuit 219.

Figure 8:
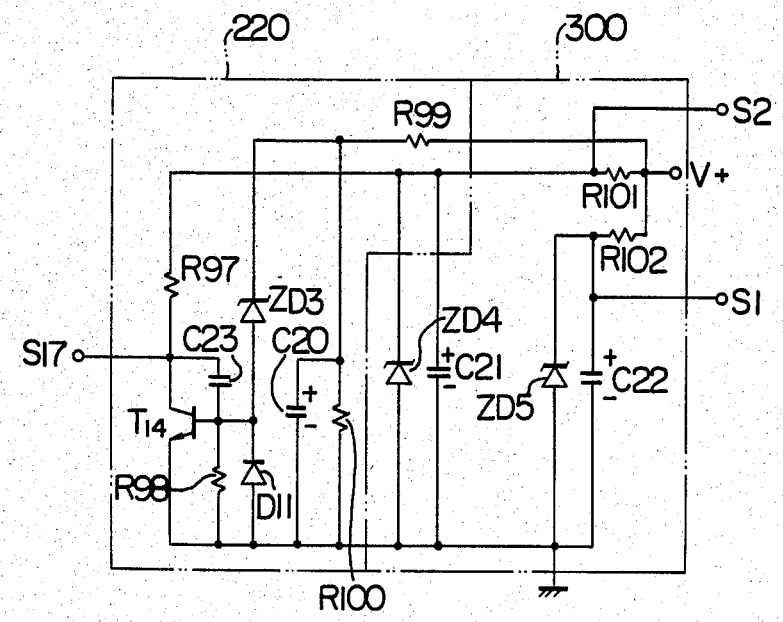

The diagram of FIG. 8 illustrates the low-voltage detector circuit 220, and the source voltage circuit 300 in detail.

In the drawing, the terminal S17 of FIG. 5 is connected to a resistor R97, the collector of a transistor T14 and a capacitor C23. The other end of the resistor R97 is connected to the battery power supply V+. Also, the emitter of the transistor T14 is grounded, and the base thereof is connected to the other end of the capacitor C23, the resistor R93, the cathode of the diode D11 and the anode of the zener diode ZD3. The other end of the resistor R98 is grounded and the anode of the diode D11 is also grounded. The cathode of the zener diode ZD3 is connected to the battery V+ through the resistor R99. The cathode of the zener diode ZD3 is connected to the resistor R100 and the capacitor C20. The other end of the resistor R100 and the other end of the capacitor C20 are both grounded.

The resistors R97, R98, R99, the capacitors C20, C23, the diode D11, the zener diode ZD3 and the transistor T14 make up the low-voltage detector circuit 220.

The battery power supply V+ is connected through the resistor R101 to the terminal S2 of FIG. 2. The resistor R101 is connected to the cathode of the zener diode ZD4 and the capacitor C21. The anode of this zener diode ZD4 and the other end of the capacitor C21 are both grounded.

On the other hand, the battery power supply V+ is connected to the resistor R102, and the other end of this resistor R102 is connected to the terminal S1 of FIG. 2, the cathode of the zener diode ZD5 and the capacitor C22. The anode of the zener diode ZD5 and the other end of the capacitor C22 are both grounded.

The resistors R101, R102, the capacitors C21, C22 and the zener diodes ZD4, ZD5 make up the source voltage circuit 300.

Now, the operation of the knock control system 200 will be explained.

Figure 9:
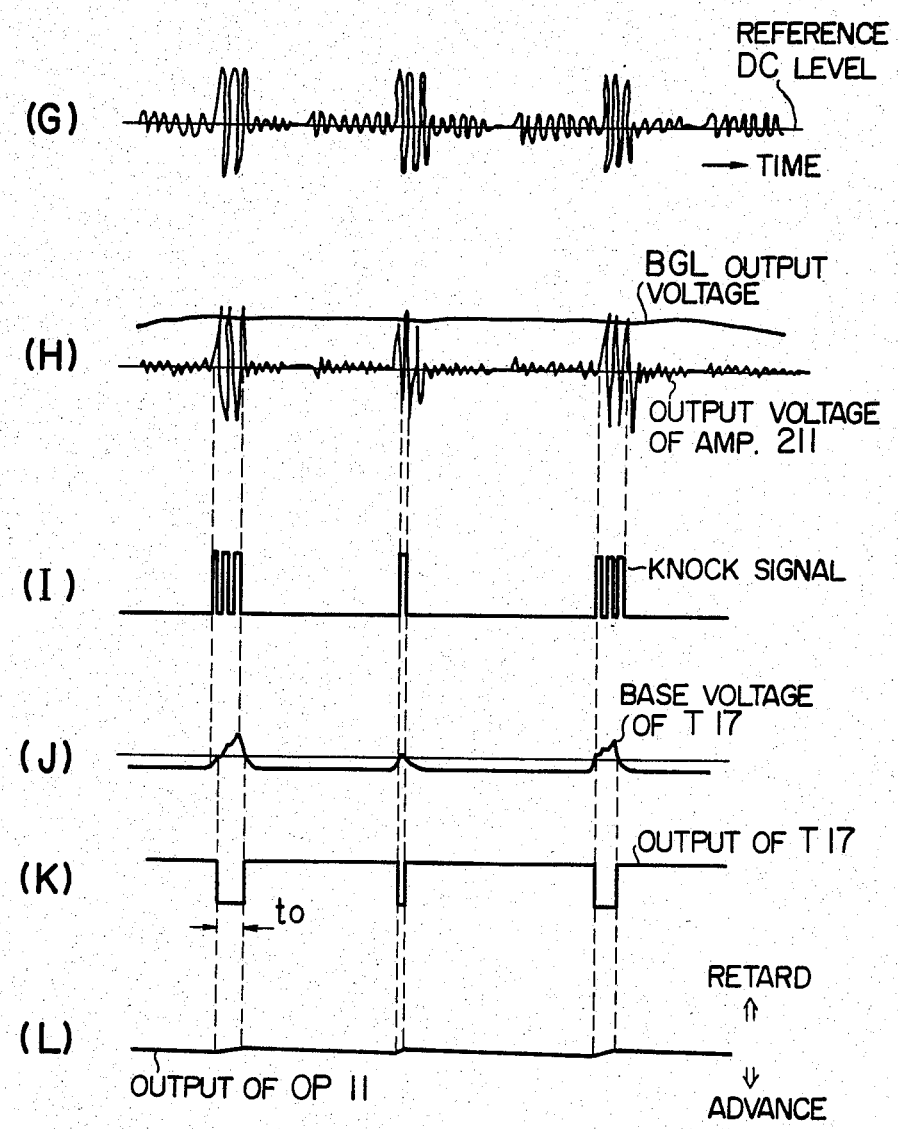
FIGS. 9A–9L are a time chart showing signal waveforms produced at the various parts of FIG. 1.

First, the signal as shown in FIG. 9 (A) is applied to the terminal IG of FIG. 6, whereupon the transistor T9 is turned on at the "high" state of this signal, and the transistor T10 is turned off. When the transistor T10 is turned off, the route of current flow from the terminal S1 of the power supply, through the resistor R78, the resistor R79, the capacitor C13, to the transistor T11 is formed. On the other hand, the "low" state of the base signal turns off the transistor T9, while the transistor T10 is turned on, so that the route of current flow from the terminal S1 of the power supply through the resistor R80, the capacitor C13, the resistor R79, the diode D8, the transistor T10 to the ground is formed. These two routes provide a charge-discharge circuit for the capacitor C13, so that the a pulse in synchronism with the spark timing with the time duration of t₁ as shown in FIG. 9 (B) is generated at the collector terminal of the transistor T11. This signal is applied to the base of the transistor T1 of the ignition noise cut circuit 202 thereby to provide an ignition noise cut signal. At the same time, this signal is applied to the base of the transistor T2 of the mask circuit 207. Further, the same signal is applied to the base of the transistor T5 of the mask circuit 214 to function as an ignition noise cut signal. FIG. 9 (A) shows an ignition timing waveform, which actually provides the base signal of the power transistor 503 of the contactless ignition means 500 described later. At "high" state of this signal, the power transistor 503 is turned on, while at "low" level thereof, the power transistor 503 is turned off. The spark of the ignition coil is generated in the course of switching from "on" to "off" of the transistor. The signal of FIG. 9 (B) provides a pulse output signal of a predetermined duration of the monostable multivibrator circuit 216 for generating a pulse signal of predetermined duration of t₁ by being triggered at the time of switch from "on" to "off" of the base signal. In other words, this signal provides the collector waveform of the transistor T11.

If the input impedance of the knock control system is increased, the external noises are likely to be superimposed. A typical external noise is the ignition noise (Ig noise) generated in synchronism with the ignition timing.

The ignition noise of this system will be explained below. The base control of the power transistor 503 is effected by the pulse as shown in FIG. 9 (A). At "high" state of this pulse, the power transistor 503 is turned on, and vice versa. In the course of switching from the "on" to "off" state of this transistor, or when the transistor 503 is turned off, the secondary voltage of the ignition coil sharply increases, thus generating the primary noises. Further, with the increase of the secondary voltage, the insulation of the air layer between the plugs is ionized for ignition. At the time of ignition, the secondary noise is generated. The secondary noise is classified into the noise caused by the capacitance discharge current flowing in the initial state of ignition and the noise caused by the induction discharge current flowing in subsequent stage. Among the secondary noises, the former makes up a larger noise source. When the input impedance is increased, the primary noise and the secondary noise (former noise) are superimposed on the output of the knock sensor as an external noise adversely affecting the knock signal discrimination.

This external noise is required to be removed. This external noise persists for the priod of about 50 to 60 μsec. During this period, the knock sensor should be masked. For this purpose, the ignition noise cut circuit 207 is provided. The actual masking period is set to, say, about 0.8 msec sufficiently longer than the noise period mentioned above.

When the signal as shown in FIG. 9 (C) is produced from the knock sensor 100, the amplitude of the signal is reduced by being divided by the resistors R1 and R2 as shown in FIG. 9 (D) and the reduced signal is applied to the ignition noise cut circuit 202. The signal thus detected by the knock sensor 100 is one pulsating between positive and negative with the DC zero level as a reference. This ignition noise cutoff circuit 202 functions mainly by the transistor T1. The transistor T1 is turned on and off by the output of the monostable multivibrator circuit 216. The monostable circuit 216 generates a pulse of the masking period by being triggered at the fall of the base signal of the power transistor 503 shown in FIG. 9 (A). The output of the monostable circuit 216 is shown in FIG. 9 (B) and has the time of t₁ making up the masking period. The transistor T1 is turned on only during the period t₁ when the output of the monostable multivibrator circuit 216 is "1". As a result, during the period t₁, the output of the knock sensor is shorted to the ground, so that the input to the operational amplifier OP1 is eliminated thereby to mask the ignition noises.

The signal as shown in FIG. 9 (E) is produced from the ignition noise cut circuit 202.

The signal shown in FIG. 9 (E) is amplified at the operational amplifier OP1 on the one hand and the signal shown in FIG. 9 (F) is produced from the output terminal of the operational amplifier OP1 as a signal (3.6 V) of DC level by the feedback of the signal of the reference voltage generator circuit 203 on the other hand. The amplification factor (G) of this operational amplifier OP1 is given as $$G = \frac{R_4}{R_1 + R_3}.$$

The signal shown in FIG. 9 (F) is applied to the bandpass filter (BPF) 204. The bandpass filter 204 emphasizes and produces the knock signal (attenuating the other signals) and has a characteristic of attenuating other signals at a frequency slightly higher than the knock signal. The gain variable amplifier circuit 205, in response to the feedback signal from the background level detector circuit 210 through the halfwave rectifier circuit 208, changes the gain thereof in inverse proportion to the BGL output, namely, the feedback signal. The mask circuit 207 masks the output of the gain variable amplifier circuit 205 at a predetermined timing. This masking operation is performed by the pulse signal of FIG. 9 (B). In response to the output of the mask circuit 205, the BGL detector circuit 210 detects the background level. The comparator 212 compares the BGL output (voltage) of the BGL detector circuit 210 with the output of the signal amplifier circuit 211. The output signal as shown in FIG. 9 (G) is produced at the output terminal of the operational amplifier OP4 of the bandpass filter 204. The signal shown in FIG. 9 (G) is applied to the gain variable amplifier circuit 205.

One feature of the system under consideration is the circuit configuration between the gain variable amplifier circuit 205 and the comparator circuit 212. The outputs S5 and S6 of the bandpass filter 204 are applied to the gain variable amplifier circuit 205. The output of the gain variable amplifier circuit 205 is divided into two routes through the mask circuit 207. The first route is for amplifying the knock signal by the amplifier 211 and applying the amplified signal to one of the input terminals of the comparator circuit 212. The second route is includes the halfwave rectifier circuit 208, the knock signal clamp circuit 209, and the BGL detector circuit 210 having an integrator circuit and an amplifier circuit. The outpt of the BGL detector circuit 210 is applied to the other input terminal of the comparator circuit 212. The output of the BGL detector circuit 212 is negatively fed back to the gain variable amplifier circuit 205 through the gain control circuit 206.

The output of the knock sensor 100 ranges from ±5 mV to ±600 mV. Specifically, the sensor output varies in the range up to 120 times. If this output is simply amplified, say, by 100 times, the voltage of ±0.5 V to ±60 V is obtained. In the case of an automobile, the maximum battery voltage is about 12 V, and the voltage of 60 V is not used. Conventionally, therefore, a small gain is used to avoid saturation or the output is processed taking the saturation for granted. The former method results in a low sensitivity against a minute output, while the latter method leads to a low sensitivity against an input of large amplitude. The configuration of the embodiment under consideration is characterized by the provision of gain variable amplifier circuit 205 which is inserted on the output side of the bandpass filter 204 to provide an integration time constant to the output of the gain control circuit 206. With this configuration, the level difference between the knock signal and a non-knock signal is increased and an input is applied to the gain variable amplifier circuit 205 with this increased level difference, with the result that even at the time of a sudden change of the background level, the signal and the background level can be changed at the same rate, thus producing an output of superior S/N ratio.

The output filtered through the bandpass filter 204 is thus applied through the resistor R19 to the operational amplifier OP5 of the gain variable amplifier circuit 205. The negative terminal of the operational amplifier OP5 is provided with an FET the gain of which is controlled through the gain control circuit 206. As a result, the gain of the gain variable amplifier circuit 205 is changed in accordance with the output of the operation amplifier OP10. The output of the gain variable amplifier circuit 205 is masked at a predetermined timing by the mask circuit 207, and through the capacitor C18 and the resistor R21 applied to the half wave rectifier circuit 208.

The gain G (Z) of the gain variable amplifier circuit 205 is given as described below.

Let the output resistance of the field effect transistor in the non-saturated region be r. Then r is expressed as $$r = 1 / \left\{ 1 - \left( \frac{V_{DS} - V_{GS}}{-V_P} \right)^{\frac{1}{2}} \right\} / Y_O \quad (1)$$

where $V_{DS}$ is the drain-source voltage, $V_{GS}$ the gate-source voltage, $V_P$ the pinchoff voltage, and $Y_O$ the admittance.

The gain G(Z) of the gain variable amplifier circuit 205 is given as $$G(Z) = 1 + \frac{R_{23}}{R_{21}} \left[ 1 + \frac{R_{21}}{R_{22} + \frac{1}{Y_O \left\{ 1 - \left( \frac{V_{DS} - V_{GS}}{-V_P} \right)^{\frac{1}{2}} \right\}}} \right] \quad (2)$$

The variation of the output resistance of the field effect transistor against the voltage $V_{DS}$ is smaller, the smaller the voltage $V_{DS}$. Therefore, the gain of the bandpass filter is set so that the background noise signal of the output of the bandpass filter 204 is about several mV. As a result, the value of $V_{DS}$ in equation (2) is sufficiently small as compared with the voltage $V_{GS}$, so that in this calculation the value $V_{DS}$ of equation (2) is handled as 0 V.

The waveform produced from the gain variable amplifier circuit 205, which contains the ignition noise mentioned above, is masked by the mask circuit 207. Specifically, the trasistor T2 of the mask circuit 207 is turned on by the output signal of the monostable multivibrator circuit 216 applied to the base of the transistor T2. The turning on of the transistor T2 causes the output of the gain variable amplifier circuit 205 to drop to the ground potential and is masked.

The signal thus masked is applied to the half-wave rectifier circuit 208 and the signal amplifier circuit 211. In the half-wave rectifier circuit 208, the diodes D1 and D2 function to rectify only the positive half component of the signal and the resulting signal is applied to the knock signal clamp circuit 209. The knock signal is further integrated and smoothed by an integrator circuit including the resistor R40 and the capacitor C16 of the background level detector circuit 210 and after being amplified at the operational amplifier OP10, is applied to the comparator circuit 212.

The signal amplifier circuit 211, on the other hand, has an amplification function at the amplification factor of the operational amplifier OP8.

The gain G1 of the half wave rectifier circuit 208 is given as $$G1 = \frac{R_{25}R_{26}}{R_{24}R_{26} + R_{27}(R_{24} + R_{26})} \quad (3)$$

while the gain G3 of the amplifier constructed of the resistors R44, R45 and the operational amplifier OP10 is expressed as $$G3 = 1 + \frac{R_{45}}{R_{44}} \quad (4)$$

Assuming that the half wave peak voltage is E, the gain G2 of the integrator including the resistor R40 and the capacitor C16 at the time of application of the half wave rectification signal is given as $$R_{40}\frac{dq}{dt} + \frac{q}{c} = A \quad (5)$$

where
$t_0 \leq t \leq t_1$: $A = E\sin(\omega t)$
$t_1 \leq t \leq t_2$: $A = 0$ As a result, the terminal voltage $V_C(t)$ of the capacitor C16 is $$V_{C1}(t) = \frac{E}{1+(\omega C_{16}R_{40})}\{\sin(\omega t) - \omega C_{16}R_{40}\sin(\omega t)\} + \left\{V_C(t_0) + \frac{\omega C_{16}R_{40}}{1+(\omega C_{16}R_{40})^2}E\right\}e^{-\frac{t}{C_{16}R_{40}}} \quad (6)$$

where $t_0 \leq t \leq t_1$ $$V_{C2}(t) = V_{C1}(t_2)e^{-\frac{1}{C_{16}R_{40}}(t-t_1)} \quad (7)$$

Under stable conditions, $$V_{C1}(t_0) = V_{C2}(t_2)$$

Thus, $V_{C1}(t_0)$ is given as $$V_{C1}(t_0) = \frac{\omega C_{16}R_{40}}{1+(\omega C_{16}R_{40})^2} \cdot \frac{1}{e^{\frac{\pi}{\omega C_{16}R_{40}}}-1} \cdot E \quad (8)$$

Substituting $C_{16}R_{40}$ (=50 msec or more) and $f$ (=5 KHz or more) into equation (8), $$V_{C1}(t_0) = E \cdot G_2 \simeq E/\pi \quad (9)$$

On the other hand, let the difference of BGL with the voltage $V_{ref}$ (the output voltage of the reference voltage generator circuit 203 of, say, 3.6 V) be $\Delta V_{BGL}$, the output voltage of the gain control circuit be $V_C$, and the output voltage of the bandpass filter 204 be $V_{in}$. Then from equations (2), (3), (4) and (9), the background level voltage is given as $$\Delta V_{BGL} = G1 \cdot G2 \cdot G3 \cdot G(Z) \cdot V_{in} \quad (10)$$

The gate-source voltage ($V_{GS}$) of the field effect transistor is given as $$V_{GS} = V_C - V_{ref} \quad (11)$$
$$= \frac{R_{31}}{R_{33}}V_{ref} - \frac{R_{31}}{R_{46}}\Delta V_{BGL}$$

Erasing $V_{GS}$ from equations (10) and (11), $$V_{in} = \frac{\Delta V_{BGL}}{G1 \cdot G2 \cdot G3\left[1+\frac{R_{23}}{R_{21}}\left\{1+\frac{R_{21}}{R_{22}+\left\{\frac{1}{Y_{O1}-\left(\frac{R_{46}\cdot R_{31}\cdot V_{ref} - R_{31}\cdot R_{33}\cdot \Delta V_{BGL}}{R_{46}\cdot R_{33}\cdot V_P}\right)^{\frac{1}{2}}}\right\}}\right\}\right]}$$

Figure 10:
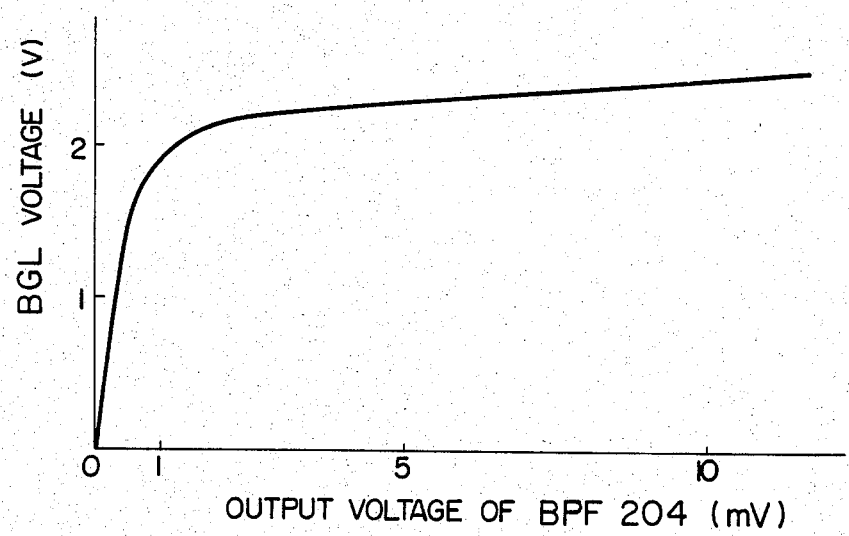
FIG. 10 shows a BPF voltage - BG voltage characteristic.

In this way, the characteristics as shown in FIG. 10 are obtained from the calculation formula with $V_P$=about 2 V, $R_O$=85Ω and $Y_O$=about 12 mΩ for the field effect transistor.

The background level thus obtained and the signal are compared with each other at the comparator 212 as shown in FIG. 9 (H).

The relation between the gain variable amplifier circuit 205 providing the feature of the embodiment under consideration and the gain control circuit 206 will be described below.

The gain variable amplifier circuit 205 is controlled by the output produced at the output terminal of the output operational amplifier OP7 of the gain control circuit 206. When the output of the operational amplifier OP7 is "high", the gate voltage of the field effect transistor is increased and the non-saturation resistance (drain-source resistance of about 200Ω) of the field effect transistor is small. Thus the gain of the operational amplifier OP5 is greatly increased (by about 30 times). On the other hand, if the output of the operational amplifier OP7 is small, the gate voltage of the field effect transistor is decreased so that the non-saturation resistance between drain and source is very large (say, about 20 KΩ) while the gain of the operational amplifier OP5 is very small (say, three times).

If the background level voltage is higher than, say, 3.6 V at the division point of the resistors R46 and R33, for instance, the gain of the operational amplifier OP5 is decreased. When the background voltage is lower than 3.6 V, by contrast, the gain of the operational amplifier OP5 is increased.

An integrator circuit comprised of the resistor R30 and the capacitor C15 is provided at the output side of the gain control circuit 206. This integrator circuit has a time constant of about 0.5 seconds larger than that of the integrator circuit (about 0.2 seconds or smaller) comprised of the capacitor C16 and the resistor R40 of the background level detector circuit 210. As a result, the gain is maintained substantially constant during the period of about 0.5 seconds.

Engine vibrations undergo constant changes even when the revolutional speed and the load conditions are constant. Such vibrations always contain small ripples. Without the integrator circuit including the resistor R30 and the capacitor C15, therefore, the gain (of the gain variable amplifier circuit 205) is suddenly changed against the vibration ripple signal. Although the output signal of the sensor changes following the sudden change of the gain, the background level to be compared with the knock sensor output signal at the comparator 212 is delayed in response by the time constant on account of the integration time constant (of about 0.2 seconds) due to the resistor R40 and the capacitor C16. Then the previous background level instead of the background level associated with the knocking is undesirably compared.

The comparator 212 produces a rectangular wave as shown in FIG. 9 (I). This pulse signal is applied to the knock signal voltage converter circuit 215 through the mask circuit 214.

In the mask circuit 214, the transistor T5 is turned on by the output signal from the monostable multivibrator circuit 216, when the output of the comparator 212 flows to the ground and is masked through the transistor T5. When the transistor T5 is off, the output signal from the comparator 212 is stored in the capacitor C9 and through the resistor R53, drives the transistor T7. The transistor T7 is driven by the output signal of the 4000-rpm detector circuit 219 through the resistor R54. The source voltage applied to the base of the transistor T6 from the terminal S17 is the output voltage of the low-voltage detector circuit 220. At the time of engine start, the battery voltage is lower than a predetermined lowest allowable voltage. This is also the case when the battery capacity is decreased. At the time of this abnormal voltage drop, a high voltage is applied to the base of the transistor T6, while a low voltage is applied thereto at the time of high voltage. When this voltage is high, the transistor T6 is turned on, and the transistor T7 is kept off regardless of the signal applied through the resistors R53 and R54. When the voltage applied to the base of the transistor T6 is low, on the other hand, the transistor T6 is turned off, with the result that the transistor T7 is turned on and off by the voltage value through the resistors R53 and R54.

In FIG. 5, the resistors R55, R56, R57, R60, R62 and the transistor T4 make up a fixed advance angle setting circuit. The advance output signal thus produced is determined by the source voltage supplied from the terminal S17 for the advance at the time of engine start.

The operational amplifier OP11, the capacitors C17, C18 and the resistor R64 make up an integrator. The operational amplifier OP12, the resistors R65, R69, R70, R71, R73, R72, the diode D5, and the transistor T8 make up a maximum voltage clamp circuit. Further, the operational amplifier OP13, the resistors R67, R68 and the diode D4 make up a minimum voltage clamp circuit. The integrator, the maximum voltage clamp circuit and the minimum voltage clamp circuit provide an integrator circuit.

Assume that the knock signal produced from the comparator 212 turns on the transistor T7 in synchronism with the knock signal. As shown in FIG. 9 (I), during the pulse duration of $t_0$ (about 40 to 70 μsec) of the knock signal, the transistor T7 conducts and the current $i_1$ flows from the operational amplifier OP11 through the capacitors C18, C17, the resistor R63 and the transistor T7 to the earth. At this time, the operational amplifier OP11 produces an output voltage of 3.6 V.

Under this condition, the voltage increase rate $\Delta V_1$ of the operational amplifier OP11 for each pulse (voltage increase per pulse) is given from $$i_1 = \frac{3.6}{R_{63}} \tag{13}$$

as $$\Delta V_1 = \frac{i_1}{C} \tag{14}$$

and the capacitance C is a series capacitance of the capacitors C17 and C18. As obvious from this equation (14), the output voltage of the operational amplifier OP11 increases in proportion to the number of the knocking pulses.

The zener voltage of the zener diode ZD4 is 6 V. The voltage at the positive terminal (+) of the operational amplifier OP11 stands at 3.6 V.

The current $i_2$ is expressed as $$i_2 = \frac{1}{R_{55}//R_{56} + R_{57}} \times \left( \frac{R_{56} \times (ZD4 - 3.6)}{R_{55} + R_{56}} - 3.6 \right) \tag{15}$$

The output voltage of the operational amplifier OP11 decreases at the voltage drop rate (voltage drop value per period) $\Delta V_2$ shown below.

$$\Delta V_2 = \frac{i_2}{C} (V) \tag{16}$$

The output of the integrator is clamped at maximum value thereof by the clamp voltage of the maximum clamp circuit, while the minimum value thereof is clamped by the clamp voltage of the minimum clamp circuit.

The integrator circuit is adapted to provide a specified advance characteristic (advance value) by the turning on of the transistor T4 in response to the output voltage of the low-voltage detector circuit 220 at the time of engine start. This advance characteristic is such that the actual advance (retard) is controlled by the retard circuit 502 in accordance with the command of the integrator circuit of the knock signal voltage converter circuit 215. This retard circuit 502 is provided, for instance, by the circuit disclosed in the U.S. patent application Ser. No. 80,202, by Noboru Sugiura, filed Oct. 1, 1979 and assigned to the assignee of this application "Ignition Timing Control System for Internal Combustion Engine".

The operation of the retard circuit 502 will be described below.

Figure 11:
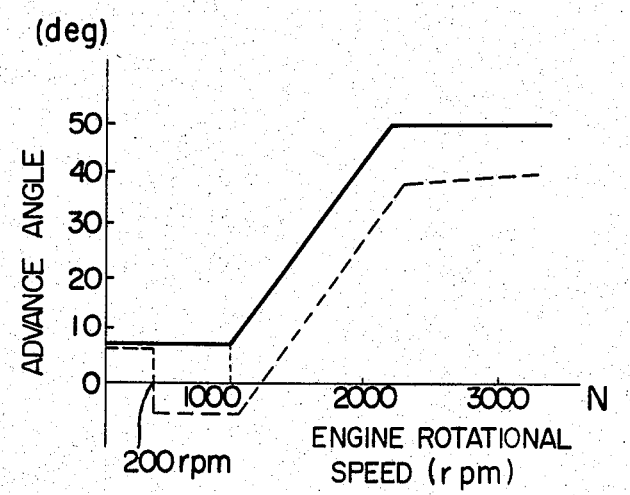
FIGS. 11 and 12 show the ignition timing characteristic of a knock control system according to the present invention.

Generally, the ignition timing characteristic is relative and is determined by the distributor and an operating mode which is in turn determined by the ignition system used. The maximum retard characteristic is prepared for the knocking, and this characteristic is followed at the time of a knocking. FIG. 11 shows the advance and retard characteristics, in which the solid line represents the minimum retard characteristic (minimum clamp voltage) for a certain operating mode and the dotted line represents the maximum retard (maximum clamp voltage) at the time of a knocking. At the time of a low speed below, say, 200 r.p.m, the control is effected to attain the maximum advance characteristic depending on the ignition timing characteristic as far as possible. The use of this characteristic is in order to accomplish the starting without fail. If the ignition timing is delayed at the time of engine start, the engine is subjected to reverse torque so that a very large load is imposed on the starter. As a result, the drive current for the starter is abnormally increased to such a degree that the engine cannot be started by the starter, thereby leading to a starting failure. In order to prevent such a starting failure, the maximum advance characteristic determined by the ignition timing characteristic is attained at the speed of 200 r.p.m. or lower at the time of starting.

Figure 12:
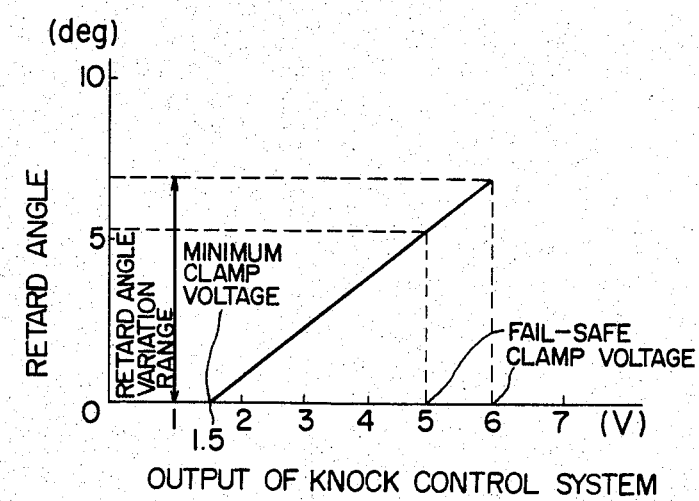

The retard circuit for attaining the abovementioned feature is shown in FIG. 12. As shown in the drawing, the retard characteristic inclined by a predetermined angle is provided against the output voltage of the integrator, namely, the output of the knock signal voltage converter circuit 215. Consequently, an advance of a predetermined angle is secured for each period. In other words, the ignition timing is advanced by a predetermined angle for each period while being retarded in accordance with the number of the knocking pulses.

The battery source is connected to the V+ terminal, and being cut at a level higher than a predetermined voltage (6.2 V) by the zener diode ZD5, produces B=6.2 V. A voltage reflecting the start detection is produced at the terminals S2 and S17. Specifically, the battery voltage is decreased at the time of engine start. When this decrease exceeds a reference value, the transistor T14 is turned off to give the same value for the terminals S2 and S17. The same operation is performed when the power capacity of the battery is decreased. When the source voltage of the battery is normal, the transistor T14 is turned on and the terminal S17 is substantially reduced to the earth potential, the voltage at the terminal S2 being equivalent to the voltage drop due to the resistor R97. The resistor R97 is set to a comparatively high level of 22 K$\Omega$. This voltage of the terminal S17 is applied to the base of the transistor T4 and the base of the transistor T6 to set a predetermined advance characteristic for engine start.

Now, the operation of the integrator circuit for controlling the retard circuit 502, specifically, the advancing operation at the time of engine start will be described. The zener diode ZD3 has a zener voltage of about 6 V. When the source voltage V+ is low, that is, at the time of engine start with the starter on, the voltage at the middle point of the resistors R99 and R100 is incapable of turning on the zener diode ZD3. As a result, the transistor T14 is turned off and the transistors T6 and T7 are turned on. Under this condition, the transistor T7 is turned off. With the transistor T4 turned on, the current flows in the same direction as the current $i_2$ through the resistor R62 from the power supply, so that the output of the operational amplifier OP11 is reduced to the same voltage as the voltage at point k and clamped. The voltage at point k corresponds to the minimum clamp voltage of 1.5 V shown in FIG. 12. The output thus clamped sets the maximum retard characteristic for engine start shown by the dotted line in FIG. 11. As a result, the retard circuit 132 is controlled and thereby set to the maximum retard characteristic.

Now, the F-V generator 217 will be explained. The transistor T12 is turned on when two conditions are met, that is, when the output signal of the monostable multivibrator circuit 216 is in "high" state and the transistor T9 is off. The transistor T12 is thus turned on for the pulse duration of $t_1$ shown in FIG. 9 (B). The period of this pulse is proportional to the engine speed and therefore the transistor T12 is turned on in accordance with the engine speed. The positive terminal of the operational amplifier OP14 is impressed with the voltage of about 1.7 V at the junction point of the resistors R67 and R68. When the transistor T12 is on, the route is formed from the output side of the operational amplifier OP14 to the capacitor C19 to the resistor R84 to the transistor T12 to the earth thereby to charge the capacitor C19. When the transistor T12 is off, the charges of the capacitor C19 flow into the resistor R85. The operational amplifier OP14 produces an output corresponding to the error between the voltages applied to the negative and positive terminals thereof, which output voltage is applied to the negative terminal of the comparator C03. The positive terminal of the comparator C03 is supplied with a constant voltage of 3.0 V divided by the resistors R88 and R89. The negative terminal of the comparator C03, on the other hand, is supplied with a voltage corresponding to the engine speed higher than 1.7 V which is compared with the constant voltage of 3 V. When the voltage thus compared is 3 V or higher, the output of the comparator C03 is reduced to "low" state, while when it is lower than 3 V, the output is raised to "high" state. The reference voltage of 3 V is corresponds to high engine speed. Specifically, the engine speed corresponding to this voltage of 3 V is set to 2000 r.p.m. Only when the engine speed is lower than 2000 r.p.m., therefore, the output of the comparator C03 is raised to "high" state. When the engine speed is lower than 2000 r.p.m., the transistor T8 of the knock signal voltage converter circuit 215 is turned on. With the turning on of the transistor T8, the voltage applied to the negative terminal of the operational amplifier OP12 is reduced below the voltage associated with the turning off of the transistor T8. The diode D9 and the resistor R90 are required to be provided with the hysteresis and take time before responding to the engine speed of 2000 r.p.m. During this period, the engine speed may increase to some degree, so that the output is produced taking this increase into account.

The output of the operational amplifier OP14 is applied to the negative terminal (−) of the comparator C04. The positive terminal (+) of this comparator circuit C04 is impressed with a constant voltage of 5.0 V divided by the resistors R94, R95 and R109 connected in series. The negative terminal (−) of the comparator C04 is supplied with the voltage higher than 1.7 V corresponding to the engine speed, which voltage is compared with the constant voltage of 5 V. When the voltage thus compared is higher than 5 V, the output of the comparator C04 is reduced to "low" state, while if it is lower than 5 V, the output of the comparator C04 is raised to "high" state. The voltage of 5 V providing a reference is one corresponding to the high engine speed. Specifically, the engine speed corresponding to this 5 V is set to 4000 r.p.m. Consequently, the output of the comparator C04 is raised to "high" only when the engine speed of lower than 4000 r.p.m. is involved. When the engine speed exceeds 4000 r.p.m., the voltage applied to the negative terminal (−) of the operational amplifier OP12 is reduced as if the transistor T8 of the knock signal voltage converter circuit 215 is turned on.

Now, the fail-safe circuit 218 will be described. This fail-safe circuit 218 is for open detection and decides at the operational amplifier OP9 whether or not the background voltage is higher than 1 V in a certain engine speed range higher than 2000 r.p.m. The voltage at the negative terminal (−) of this operational amplifier OP9 stands at a reference voltage $V_{ref}$ of 3.6 V plus 1 V. Under normal conditions, the background voltage is higher than 1 V for more than 2000 r.p.m. An input open condition, under which the background voltage is lower than 1 V, can be detected.

In normal operation, the positive input (+) of the operational amplifier OP9 is higher and therefore a "high" signal is produced from the output thereof, which signal is applied to the base of the transistor T13 thereby to turn on the same transistor. With the transistor T13 turned on, the normal knock control is effected since the transistor T8 of the knock signal voltage converter circuit 215 is cut off. In the case where an open fault is involved, however, the transistor T13 is turned off and the transistor T8 is turned on, so that the timing is retarded to the maximum retard value.

According to the embodiment under consideration, therefore, the sensor output signal and the background level may be compared with each other as a value amplified at the same gain.

It will thus be understood from the foregoing description that according to the present invention, the knock control is effected accurately.

I claim:
1. A knock control system comprising:
   a knock sensor for detecting an engine knock signal;
   a gain variable amplifier coupled to receive and amplify a knock detection signal from said knock sensor;
   first integrating means having a first time constant and coupled to receive an output signal of said gain variable amplifier to provide an integrated output signal;
   a gain control circuit for delivering a gain control signal for controlling gain of said gain variable amplifier on the basis of the level of said integrated output signal; and
   second integrating means having a second time constant larger than said first time constant for integrating said gain control signal delivered from said gain control circuit prior to application to said gain variable amplifier.
2. A knock control system according to claim 1, further comprising a comparator circuit for comparing the output signal of said gain variable amplifier with said integrated output signal from said first integrating means so as to provide a spark timing control signal to an ignition control device based on said comparison of said integrated output signal and the output signal from said automatic gain control circuit.

* * * * *